March 5, 1929.  W. BLUMENTHAL  1,704,278
HANDLE FOR VESSELS
Filed Jan. 21, 1927   2 Sheets-Sheet 1
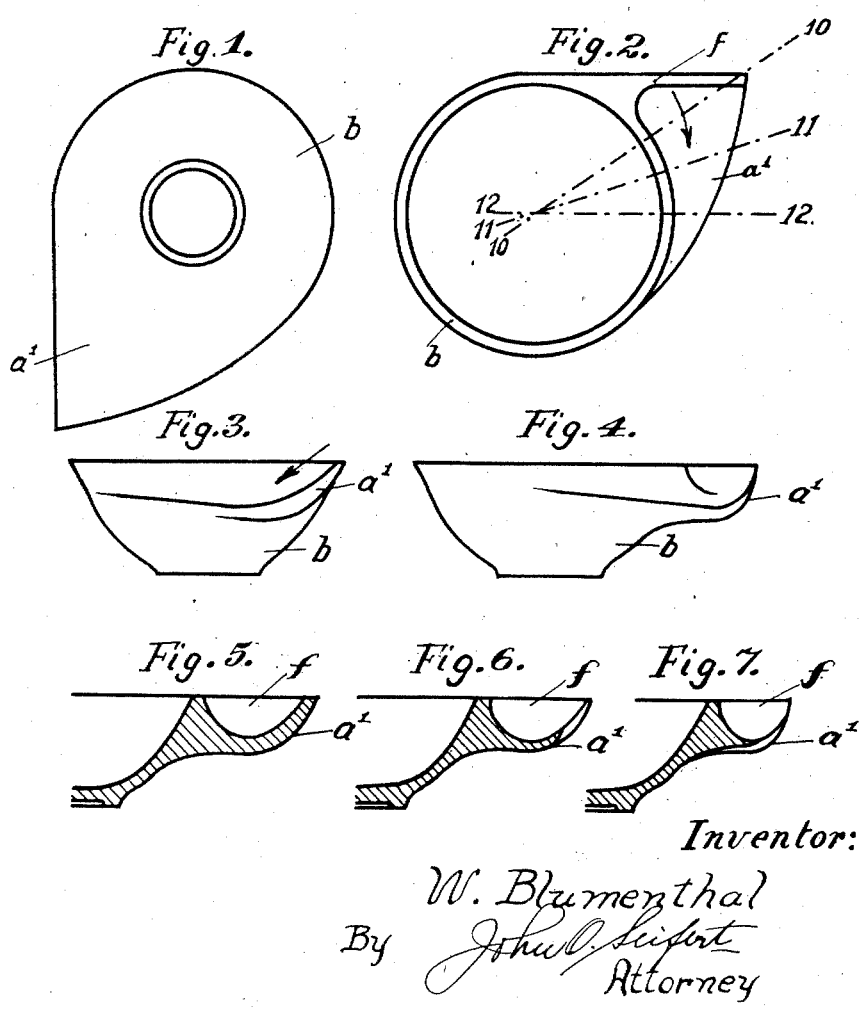

March 5, 1929.　　　W. BLUMENTHAL　　　1,704,278
HANDLE FOR VESSELS
Filed Jan. 21, 1927　　　2 Sheets-Sheet 2
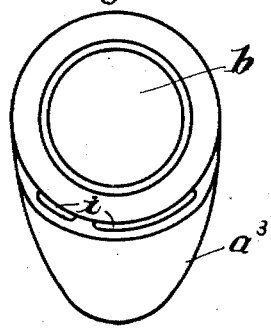
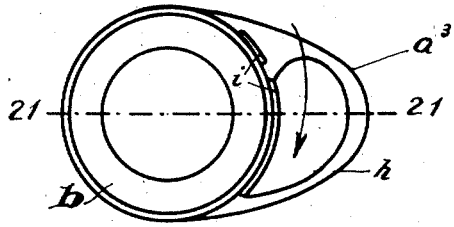
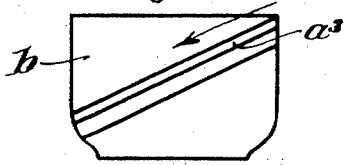
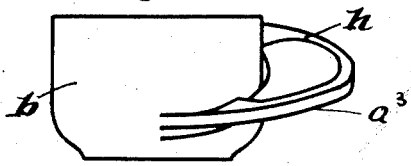
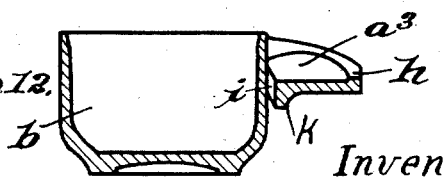
Inventor:
W. Blumenthal
By　*[signature]*
　　　Attorney Patented Mar. 5, 1929.

1,704,278

UNITED STATES PATENT OFFICE.

WALTER BLUMENTHAL, OF BERLIN-SCHONEBERG, GERMANY.

HANDLE FOR VESSELS.

Application filed January 21, 1927, Serial No. 162,663, and in Germany January 23, 1926.

This invention relates to a handle for vessels.

It has hitherto been usual to form the handles of vessels either as a curved member arranged adjacent towards the top of the vessel, or to constitute a solid vertical portion or plate, or in the form of projections provided on diametrically opposite sides, or alternatively in the form of a simple lateral supporting member of a curved or of a more or less straight form. These handles are provided on the vessel itself, or on a holder for such vessel, and are either immovable or otherwise.

Relatively small vessels furnished with one of the known types of handles, which can only be held by the forward extremities of the fingers of one hand, frequently represents a matter of certain inconvenience in use. With certain handles, due to the more or less awkward manner in which the same are required to be held, an entirely unnecessary amount of exertion is consumed in the holding of the vessel, whereby the fingers become quickly fatigued; in the case of others the area allowed for engagement by the fingers is so small or so inconveniently shaped that when holding the vessel for any length of time the pressure on the fingers becomes extremely unpleasant. The awkward or fatiguing manner in which these handles require to be held is very liable to result in a tipping or downward tilt of the vessel, causing the contents to be spilled, whilst moreover the fingers are very frequently essentially placed in such close proximity to the hot vessel itself, such as a cup or the like, that somewhat painful contact with the same is not entirely avoidable.

The object of the present invention is to overcome the disadvantages referred to, and this is accomplished by providing a handle which is particularly adapted to perform its primary function, and which at the same time facilitates the use of the vessel.

In the drawings Figures 1 to 4 illustrate a form of embodiment, taken from below, above, from the rear and the side, respectively.

Figs. 5 to 7 are sections taken on lines 10—10, 11—11 and 12—12 respectively of Fig. 7.

Figs. 8 to 11 show a further form of embodiment, also in views taken from below, above, from the rear and the side, respectively, and Fig. 12 is a section through the line 21—21 of Fig. 9.

The handle is intended both for vessels themselves, as well as for holders for vessels. In the case of all forms of embodiments the handle is provided on the side of the vessel, projecting laterally from the same and having wide upper and lower gripping surfaces, and the said surfaces of the handle sloping in a direction as indicated by the arrows in Figures 2, 3, 9 and 10.

In the embodiment illustrated in Figures 1 to 5 of the drawings the handle $a^1$ is arranged on and extends laterally from the side of the vessel $b$ and has large or wide top and bottom surfaces to serve as gripping surfaces for the thumb and fingers to hold and support the vessel, these gripping surfaces being inclined to the horizontal in a direction oblique to the wall of the vessel from the top toward the bottom of the vessel to conform to the natural position and form of the hand when grasping the handle to manipulate the vessel for drinking therefrom or the like. The handle is also arranged of arcuate or curved form in cross section and gradually diminishes in thickness from the juncture thereof with the vessel to the outer edge with the concave surface at the top adapted for engagement by and conforming to the shape of the thumb and the outer or under convex surface conforming to the natural shape of the fingers when the handle is grasped by the thumb and fingers. When the handle is grasped the thumb engages the upper concave surface and the fingers the under convex surface, and when so held the weight of the vessel together with its contents is supported by the fingers resting beneath the handle and the forces necessary for establishing equilibrium are exerted by the fingers and the thumb engaged upon the handle; the bearing or supporting resistances being directed vertically upwards and downwards and thus the handle is held between the thumb and the fingers. Should the vessel be tilted to pour out the contents or in drinking from the vessel the tip of the thumb abuts against the upper concave portion $f$ of the handle and supports the vessel in the tilted position.

In the embodiment illustrated in Figures 8 to 12 the handle $a^2$ extends laterally from the vessel $b$, the opposite gripping surfaces being wide and substantially flat and slope from the top toward the bottom of the vessel, the direction of the slope following the contour of the wall of the vessel. The marginal portion of the upper surface of the handle has an upwardly extending flange $h$ to serve as the abutment to prevent the handle from slipping from between the thumb and fingers, and at the same time also serving as an abutment for engagement of the thumb to support the vessel when it is tilted. A flange or rib $k$ extends downwardly from the under surface of the handle, and is arranged adjacent the wall of the vessel, for engagement of the fingers to prevent the fingers from contacting with the wall of the vessel, this being of importance should the vessel be hot. The juncture of the handle with the vessel is only at the end portions of the handle with the intermediate portion of the handle arranged in spaced relation to the vessel, as shown at $i$, so that should the contents of the vessel be hot the heat thereof is only transmitted to a limited extent to the handle. When the handle is grasped between the thumb and fingers they will function in the same manner as that described in connection with Figures 1 to 7 in the manipulating of the vessel to pour or drink the contents therefrom.

The handle may be integral with the vessel or vessel holder, and consist of the same or a different material, and may be fixedly or removably mounted thereon. The form and shape of the handle as well as of the gripping surfaces and the distance apart of the latter may be varied as desired.

In contradistinction to the usual form of side handles for vessels, the handle herein described will permit vessels of fair size to be handled safely and conveniently. The surfaces with which the thumb and fingers engage are of considerable extent so that the pressure on the fingers in the lifting and manipulating of the vessel is very slight and scarcely noticeable pressure of the fingers even when holding the vessel for a relatively long period of time. The pressure of the fingers on the gripping surfaces of the handle when carrying the vessel, and also when tilting the same, is practically in a vertical direction so that a cramped grasping of the handle by the thumb and fingers, which is necessary in the grasping of other handles of vessels, is obviated. Due to the inclination of the gripping surfaces the hand in grasping the handle and in handling the vessel for drinking or the like remains always in its natural position without any forced unnatural position. Owing to the broad gripping surfaces of the handle the tilting movement necessary for pouring out the contents of a vessel may be readily accomplished in a predetermined manner. Furthermore, inconvenience in handling hot vessels due to the heat transmitted therefrom is obviated as the fingers are positioned far enough from the vessel wall so as not to be affected by such heat, and especially so when the means described is provided to prevent the fingers from coming in contact with the hot wall of the vessel.

It will be obvious that various modifications may be made in the detail construction and arrangement of the handle described and illustrated, and it is to be understood that my invention is not limited to the embodiments shown in the drawings, and that various changes may be made in the arrangement and the construction of the handle without departing from the scope of the invention.

What I claim as new and desire to secure by Letters Patent is:

1. In vessels, a handle projecting laterally from the body of the vessel and having wide upper and lower gripping surfaces arranged to extend in a plane transversely of the axis of the vessel, and said surfaces sloping so that the direction of slope follows the outline of the wall of the vessel.

2. In vessels, a laterally projecting handle having wide upper and lower gripping surfaces arranged in a plane to extend transversely of the axis of the vessel and sloping so that the direction of slope follows the outline of the wall of the vessel and curved to conform to the shape of the thumb and fingers in gripping the handle.

3. In vessels, a laterally projecting handle having wide upper and lower gripping surfaces arranged in a plane which extends in a direction transversely to the axis of the vessel and sloping so that the direction of slope follows with the outline of the wall of the vessel and curved to conform to the shape of the thumb and fingers in gripping the handle, and an abutment on the upper surface and at the outer marginal portion of the handle for engagement of and support of the vessel by the thumb when the vessel is tilted.

4. In vessels, a laterally projecting handle having wide upper and lower gripping surfaces arranged in a plane to extend transversely of the axis of the vessel and sloping so that the direction of slope follows the outline of the wall of the vessel and curved to conform to the shape of the fingers and thumb in gripping the same, an abutment on the upper surface and at the marginal portion of the handle for engagement of and support of the vessel by the thumb in the tilting of the vessel, and a projection on the lower surface adjacent the wall of the vessel to prevent the fingers from contacting with the wall of the vessel in grasping the handle.

5. As an article of manufacture, a vessel arranged with a handle projecting laterally from the body of the vessel having wide upper and lower gripping surfaces arranged in a plane which extends transversely to the axis of the vessel, and the handle extending obliquely of the vessel in a direction from the top toward the bottom and following the contour of the vessel, and the portion of the handle arranged with the gripping surfaces diminishing in thickness outward from the juncture of the handle with the body of the vessel.

6. Vessels arranged with handles as claimed in claim 5, wherein the juncture of the handle with the body of the vessel is at the opposite ends of the handle with the intermediate portion spaced from the wall of the body of the vessel.

In witness whereof I have hereunto set my hand.

WALTER BLUMENTHAL.